Figure 1:
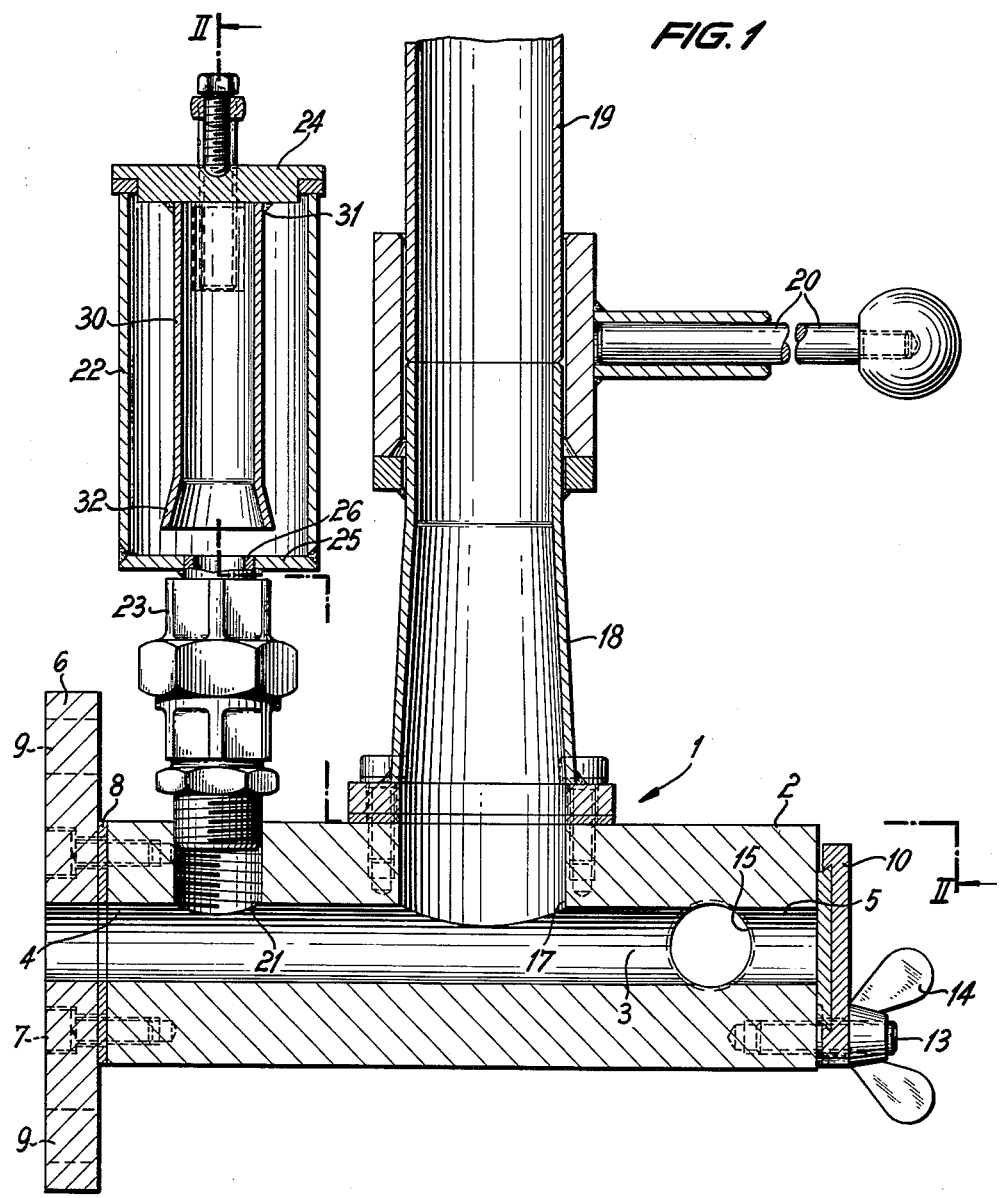

INVENTOR
ALFRED REXROTH

By Toulmin & Toulmin
Attorneys

United States Patent Office 3,086,823
Patented Apr. 23, 1963

3,086,823
METHOD AND APPARATUS FOR CHARGING CUPOLAS
Alfred Rexroth, Lohr am Main, Germany, assignor to Roxy Rexroth & Stadtler Kommanditgesellschaft, Lohr am Main, Germany
Filed Jan. 11, 1961, Ser. No. 82,103
4 Claims. (Cl. 302—36)

The present invention relates to a method and apparatus for charging cupolas, blast furnaces and the like, more particularly, to an improved method for injecting silica and metal particles into a cupola, and an improved apparatus which is longer lasting and requires less maintenance during operation than previously known apparatus of a similar nature.

In foundry work it has been common to charge the melting zone of a cupola or blast furnace with scrap metal or other materials such as silicia, calcium silicate, manganese, lime and so forth. The scrap metals are remelted for possible reuse or for use in making new batches of steel. While the heat in a cupola is considerable, a large quantity of coke must be consumed in order to provide enough heat to melt the chunks of scrap iron which are commonly used in charging a cupola. In addition, the relatively large sizes of the scrap makes it difficult to uniformly distribute the scrap metal within the melting zone of the cupola. Further, the price of scrap metal on the market is relatively high and the necessity for using scrap metal considerably adds to the cost of making steel.

It has been desirable to utilize different forms of a metal for charging cupolas but there was a considerable problem involved in properly introducing small pieces of scrap material into the melting zone of the cupola. It has therefore been proposed in the present invention to periodically inject charges of metal chips or machine-shop turnings into the blast furnace at the upper level of the melting zone. The small chips of metal are uniformly distributed over the heated surface of the coke and their small size ensures that the metal patricles are rapidly melted.

One form of apparatus which can be used to carry out this method comprises a pneumatically operated charging device which uses compressed air to force the material into the melting zone. There is a cooling air connection communicating with the apparatus and blasts of cooling air are introduced into the apparatus between injections of the material into the cupola. Steps must be taken, however, to prevent the injected materials from entering the source of cooling air and also for preventing the injected materials from expanding in the direction of the air chamber which provides the coling air.

Accordingly, a metal check valve was placed in the injection chamber which check valve is opened by the material being forced thereagainst by a charge of compressed air. The check valve is so positioned that, when it is forced open, it closes the connection to the supply of cooling air.

This check valve or flap was subjected to considerable wear because it was periodically contacted by the injected material at high pressures. Further, part of the force of the injection delivered by a propellent gas was wasted, since this force was necessary to open the check valve.

The apparatus disclosed in the present invention eliminates the disadvantages of the flap described above by providing an improved structure for preventing the injected material from entering into the source of cooling air. This improvement essentially comprises a trap which is mounted between the injection apparatus and the source of compressed air. If any materials enter the trap they will be prevented from entering the cooling air and will fall downwardly to return to the injection chamber. The pipe connection leading to the cooling air is connected to a wall of the trap and there is a check valve at the trap which normally closes the cooling air connection. This check valve is opened only when cooling air is delivered through the connection, which cooling air flows downwardly through the trap into the injection chamber.

The trap is located outside of the injection apparatus itself and, accordingly, this apparatus has a considerably simplified construction and, hence, is capable of more efficient operation when injecting the materials into the cupola.

It is therefore the principal object of this invention to provide a novel and improved method for charging a cupola.

It is another object of this invention to provide an apparatus for shooting material into a cupola wherein moving parts in contact with the material to be injected are eliminated.

It is a further object of this invention to provide a simplified construction of an apparatus for shooting materials into a cupola or the like, which apparatus is more efficient in operation.

Figure 2:
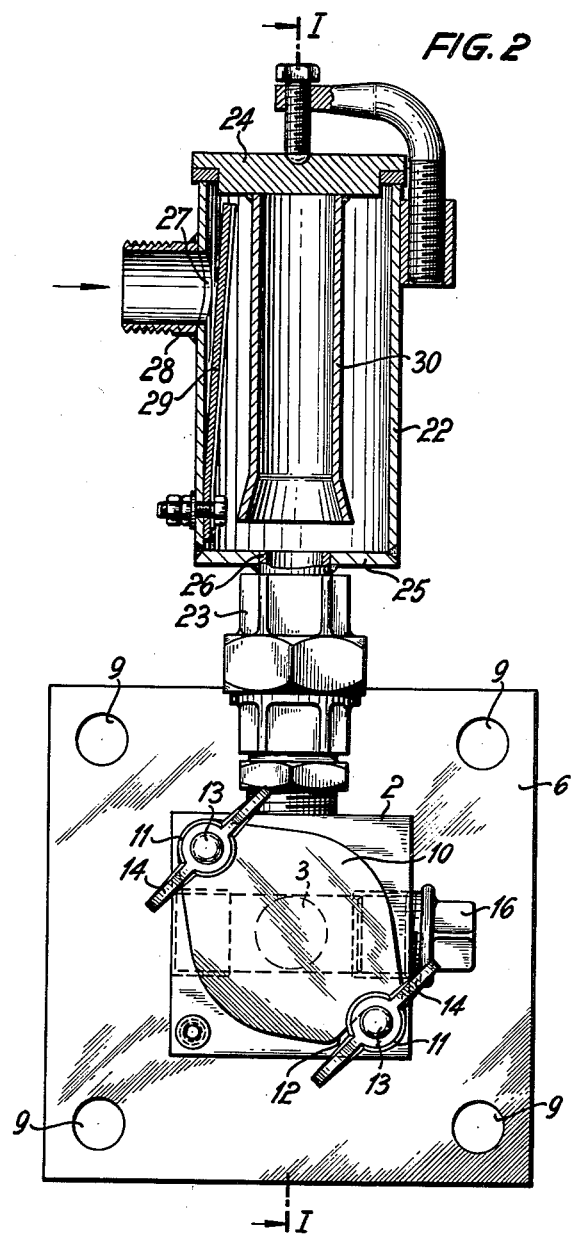

Other objects and advantages of this invention will become apparent upon reference to the accompanying description when taken in conjunction with the following drawings, wherein FIGURE 1 is a longitudinal sectional view of the apparatus of this invention along the line I—I of FIGURE 2; and FIGURE 2 is a partial sectional view, taken along the line II—II of FIGURE 1.

The method of this invention comprises assembling a charge of metallic chips or machine-shop turnings at a level of approximately that of the upper level of the melting zone of the cupola. This charge is compacted but the metallic chips are free from each other so that when a compact force is removed, the chips will scatter. A propellant such as gas under pressure or an explosive is then used to propel the charge of metal chips into the cupola through a hole in the side wall of the cupola. The propelling force is a quick impact and hence the chips are quickly scattered after being injected into the cupola. The chips are uniformly distributed over the surface of the heated coke and since the surface area is large with respect to the size of the metallic chips, the chips are melted by the heated coke in a matter of a few seconds. The molten material then flows downwardly through the coke and the succeeding charge of metallic chips is then injected into the cupola. Since the metallic chips melt in a matter of a few seconds, succeeding charges of metallic chips will not contact the metal of previous charges. Thus it is possible that the metal of one batch is completely melted and has already begun to flow downwardly to the heated coke when the next batch of metal chips is injected into the cupola.

It is preferable that the chips be dumped into a hopper which is connected by a vertical passage with the apparatus for injecting the chips into the cupola. Thus the vertical column of chips in the passage will act as a valve and it will not be necessary to utilize a valve in the apparatus for periodically admitting metal chips from the hopper into the charging apparatus. Thus, in this method the column of chips is self-regulating.

Proceeding next to the drawings, wherein like reference symbols indicate the same parts throughout the various views, a specific embodiment of a form of apparatus for carrying out the process disclosed in this invention will be described. In FIGURE 1 there is shown at 1, in a cross-section view, the specific embodiment of this apparatus. This apparatus is mounted on the wall of a conventional cupola or blast furnace in a manner to be subsequently described in detail. The apparatus is mounted so as to discharge into the melting zone of the cupola. The cupola is provided with the usual tuyeres for introducing air therein. In addition, the cupola has a passage in the wall through which charging materials are introduced.

The apparatus comprises a body 2 which is elongated and has substantially a square cross-section. This body is formed of cast iron and has a very heavy wall thickness as compared to the length of the body. The relationship of the wall thickness to the body is clearly shown in FIGURE 1 of the drawings.

There is a bore 3 longitudinally extending through the body 1. The bore has a discharge end 4 and an outer end 5. The bore is smooth on the inside and comprises a constant diameter passage and has no interruptions or projections therein.

There is a flange 6 mounted by bolts 7 onto the discharge end of the body 2. The flange also is substantially square in cross-section and is formed of cast iron. A heat-resistant gasket 8 is interposed between the flange 6 and the body 2. The flange is provided with a plurality of bolt holes 9 by means of which the flange and accordingly the entire apparatus is fastened to the wall of a cupola or a blast furnace.

A two-piece cover plate 10 is pivotally mounted on the end 5 of the body by means of a bolt and wing nut arrangement 11. The cover plate has a hook portion 12 at one end, as may be seen in FIGURE 2, which hook portion engages a bolt 13 and is secured in position by a wing nut 14. The bolt 13 and the wing nut can be made in one integral unit instead of a separate nut and bolt.

There is a transverse passage 15 which intersects the bore 3. A plug 16 closes one end of the transverse passage and the other end of the passage is connected to a source of compressed gas, such as air.

There is a charging opening 17 which communicates with the bore 3. The opening 17 is then connected to a flange of a material supply tube 18 which is tapered. A second tube 19 is connected thereto and leads to a hopper or some other supply of charging material. The handle structure 20 is provided to facilitate carrying and positioning of the apparatus.

There is an air blast opening 21, also communicating with the bore 3 in the vicinity of the discharge end 4. A closed cylinder 22 is connected by suitable pipes and fittings, indicated at 23, to the air blast opening 21.

The cylinder 22 has a closed end 24 and an apertured end 25 having an opening 26 therein. The opening 26 communicates with the pipe and fittings 23. There is an opening 27 in the wall of the cylinder 22 and this opening has a pipe 28 welded thereto for communication with a source of air pressure.

A check valve comprising a plate member of resilient metallic material, and indicated at 29, is mounted on the inner wall of the cylinder 22 to normally close the air opening 27.

Within the cylinder 22 there is provided a second cylinder 30 which has one end 31 welded to the end 24 of the closed cylinder 22 and has the other end 32 open and outwardly tapered, as may be seen in FIGURES 1 and 2. The open end 32 is slightly larger in diameter than the opening 26 and terminates at a point above the end 25 of the closed cylinder 22. The arrangement of the closed cylinder 22 and the cylinder 30 forms a trap whose operation will be subsequently described.

The source of air pressure to which the pipe 28 is connected may be at the pressure of the air supplied to the cupola for effecting burning of the coke and furnishing a source of heat for melting of the cupola charge. The cold air introduced through the pipe 28 and into the bore of the apparatus tends to cool the discharge end 4 and to prevent flame from entering this discharge end. Cold air from any source may be employed, provided only that the pressure is greater than that in the interior of the cupola. The quantity of air passing through the discharge end is comparatively small so that it has a negligible chilling effect upon the operation of the apparatus.

In the operation of this apparatus the check valve 29 is initially in the opened position, as illustrated in FIGURE 2 of the drawings. The pressure of the cooling air entering through the pipe 28 is sufficient to open the check valve and to enable the cooling air to flow downwardly through the trap into the bore of the apparatus.

When it is desired to shoot material into the cupola the material is dispersed through the charging opening 17 into the bore and a blast of compressed gas is introduced through the passage 15 into the bore of the apparatus. This blast of gas will propel the charging material through the bore 3 outwardly of the discharge end 4 into the cupola.

In the event any of the charging material should flow upwardly through the air blast opening 21 the material will be caught by the cylinder 30 and caused to return downwardly into the bore of the apparatus. Thus the material will be prevented from passing through the opening 27. Further, the blast of the propellent gases through the transverse opening 15 will increase the pressure within the apparatus so that this increase in pressure will close the check valve 29. Thus, the propellent gases will be prevented from entering the source of blast air. The blast of propellent gases through the passage 15 and the charging of the materials into the bore 3 of the apparatus occur intermittently so that the material in a succeeding shot never contacts partly melted material from a previous shot. Such a contact is undesirable since it may interrupt the continuity of the melting process.

Other forms of modifying material commonly used in cupola melting may be injected in the form of grains or shot with the scrap metal being charged. This furnishes a means for controlling the composition and quality of the melt. Such modifying materials may include silica, calcium silicate, manganese, lime, and others. In addition, coke-sand, metal shavings or borings mixed with oil, as a preservative against iron-mould, may also be used.

A plurality of the apparatus of this invention may be distributed around the melting zone of a cupola so that the entire metal charge may comprise the shavings, borings and the like, to be melted.

Instead of using compressed air to propel the charge into the cupola a charge of explosive material may be introduced into the bore 3 behind the material to be charged. When this explosive material is suitably detonated the resulting gases will propel the charging material into the cupola. This operation has the advantage that no cold air reaches the melting zone when the charge is shot into the cupola.

Thus it can be seen that the present invention provides an improved but simplified apparatus for shooting material into a cupola. By elimination of a check valve in the path of the material, maintenance problems of the apparatus are greatly reduced.

It will be understood that this invention is susceptible to modification in order to adapt it to different usages and conditions and, accordingly, it is desired to comprehend such modifications within this invention as may fall within the scope of the appended claims.

What is claimed is:

1. In an apparatus for shooting material into a cupola melting zone, the combination of a body member having a bore therethrough defining an injection chamber having a discharge end, a charging chamber communicating with said injection chamber for supplying material thereto, a closed cylinder having an opening in one end with said opening communicating with said injection chamber, means communicating with a wall of said closed cylinder and connected to a source of air pressure, a check valve on the wall of said closed cylinder to close communicationn to the source of air pressure, a second cylinder having one end mounted on the other end of said first closed cylinder, the other end of said second cylinder terminating short of said closed cylinder one end and being open, and means for intermittently supplying a propellent gas to the end of said injection chamber opposed from said discharge end to propel a charge of material out of said discharge end into a cupola.

2. In an apparatus for shooting material into a furnace under pressure, the combination of a body member having a bore therethrough defining an injection chamber having a discharge end, a charging chamber communicating with said injection chamber for supplying material thereto, an auxiliary chamber communicating with said injection chamber and connected to a source of air pressure, said auxiliary chamber comprising a check valve means disposed therein and outside of said bore to close communication to the source of air pressure, and means for intermittently supplying a propellent gas to said injection chamber opposed from said discharge end to propel a charge of material out of said discharge end into said furnace.

3. In an apparatus for shooting material into a cupola melting zone, the combination of a body member having a bore therethrough defining an injection chamber having a discharge end, a charging chamber communicating with said injection chamber for supplying material thereto, an auxiliary chamber communicating with said injection chamber and connected to a source of air pressure, said auxiliary chamber comprising a check valve means to close communication to the source of air pressure, and means for intermittently supplying a propellent gas to said injection chamber opposed from said discharge end to propel a charge of material out of said discharge end into a cupola, said charging chamber comprising means for blocking passage of said propellent gas from escaping from said injection chamber and into said charging chamber during shooting of the material into a cupola.

4. In an apparatus for shooting material into a cupola melting zone, the combination of a body member having a bore therethrough defining an injection chamber having a discharge end, a charging chamber communicating with said injection chamber for supplying material thereto, an auxiliary chamber communicating with said injection chamber and connected to a source of air pressure, a check valve means associated with said auxiliary chamber to close communication to the source of air pressure, said auxiliary chamber comprising trap means downstream from said check valve means and outside of said bore to prevent material being shot from passing to said source of air pressure, and means for intermittently supplying a propellent gas to said injection chamber opposed from said discharge end to propel a charge of material out of said discharge end into a cupola, said charging chamber comprising means for blocking passage of said propellent from escaping from said injection chamber and into said charging chamber during shooting of the material into a cupola.

References Cited in the file of this patent
UNITED STATES PATENTS

| | | |
|---|---|---|
| 1,454,979 | Michfield | May 15, 1923 |
| 2,771,323 | Taylor | Nov. 20, 1956 |
| 2,784,037 | Rexroth | Mar. 5, 1957 |
| 2,832,683 | Stockkamp | Apr. 29, 1958 |
| 2,939,782 | Modaras | June 7, 1960 |